(12) United States Patent
Van Dijk et al.

(10) Patent No.: US 6,797,379 B2
(45) Date of Patent: Sep. 28, 2004

(54) SHEET-SHAPED PRODUCT CONSISTING OF A THERMOSETTING RESIN MIXTURE AND CARBON FIBRES

(75) Inventors: Hans K. Van Dijk, Sittard (NL); Hans H. H. Hornman, Geleen (NL); Bastiaan Van Voorst, Niunspeet (NL); Peter Dijkink, Balkburg (NL)

(73) Assignee: DSM IP Assets B.V., Heerlen (NL)

( * ) Notice: Subject to any disclaimer, the term of this patent is extended or adjusted under 35 U.S.C. 154(b) by 408 days.

(21) Appl. No.: 09/988,393

(22) Filed: Nov. 19, 2001

(65) Prior Publication Data

US 2002/0122943 A1 Sep. 5, 2002

Related U.S. Application Data

(63) Continuation of application No. PCT/NL00/00335, filed on May 17, 2000.

(30) Foreign Application Priority Data

May 19, 1999 (NL) ............................................. 1012103

(51) Int. Cl.⁷ ................................................. D02G 3/00
(52) U.S. Cl. ....................... 428/401; 428/219; 428/220; 428/372; 428/213; 427/407.1; 427/532
(58) Field of Search ................................. 428/401, 213, 428/219, 220, 372; 427/407.1, 532

(56) References Cited

U.S. PATENT DOCUMENTS

| | | | | |
|---|---|---|---|---|
| 4,522,978 A | * | 6/1985 | Gardner | ........................ 525/48 |
| 4,532,296 A | * | 7/1985 | Gardner | ........................ 525/48 |
| 4,532,297 A | * | 7/1985 | Gardner | ........................ 525/48 |

FOREIGN PATENT DOCUMENTS

| | | |
|---|---|---|
| EP | 0768340 | 4/1997 |
| JP | 08258205 | 10/1996 |

* cited by examiner

*Primary Examiner*—Merrick Dixon
(74) *Attorney, Agent, or Firm*—Mayer, Brown, Rowe & Maw LLP

(57) ABSTRACT

The invention relates to sheet-shaped products processable by means of flow molding comprising carbon fibers and a radical-curable resin as the matrix, the fibers being present in the form of mats consisting of fibers with lengths of more than 1 cm and the volume percentage of the fibers relative to the resin being less than 70%, and the fibers moving freely relative to one another in the mat during flow molding, resulting in a net end product with a homogeneous fiber distribution. The invention also relates to a process for the production of sheet-shaped products by impregnating carbon fiber mats with a radical-curable resin and thickening that resin to a desired thickness, and a process for the production of molded parts with a tensile modulus of >20 GPa and a tensile strength of >200 MPa.

12 Claims, No Drawings

SHEET-SHAPED PRODUCT CONSISTING OF A THERMOSETTING RESIN MIXTURE AND CARBON FIBRES

This is a Continuation of International Application No. PCT/NL00/00335 filed May 17, 2000, which designated the U.S. and was published in English.

The invention relates to a sheet-shaped product processable by means of flow molding (hereinafter also referred to as "sheet molding compound" or "SMC"), comprising carbon fibers and a thermosetting resin mixture based on a radical-curable resin as the matrix. The invention also relates to a process for the production of such a sheet-shaped product and to processes for producing net end products from such a sheet-shaped product.

As intended in this application, radical-curable resin is understood to be any resin containing an unsaturation and being capable of curing by radicals.

Sheet-shaped products processable by means of flow molding which contain carbon fibers and a thermosetting resin mixture based on a radical-curable resin as the matrix are known. Such an SMC is for example described in CA-A-2199638. This reference however refers exclusively to the preparation of SMCs that are filled with fibrous material obtained via the chopped-strand technology. In practice, no such SMCs containing carbon fibers have however ever been marketed because such compounds cannot be produced via the normal compounding lines for glass-filled SMCs. The most important reason for this is that, after the chopping, the carbon fibers do not show suitable distribution behaviour, as a result of which the compounds have an inhomogeneous fiber distribution and show non-optimum flow. In addition, an undesired amount of conductive dust is formed in chopping carbon fibers, with all the associated problems.

The aforementioned reference does describe sheet-shaped products consisting of a thermosetting resin mixture based on a radical-curable resin and fibrous material, including carbon fibers, but there are no indications that sheet-shaped products containing carbon fibers have actually been produced.

The aim of the present invention is to provide a sheet-shaped product comprising a thermosetting resin mixture based on a radical-curable resin and carbon fibers which does not possess the aforementioned drawbacks.

Surprisingly, a sheet-shaped product processable by means of flow molding comprising carbon fibers and a thermosetting resin mixture based on a radical-curable resin as the matrix is obtained when the carbon fibers are present in the form of mats that consist substantially of carbon fibers with lengths of more than 1 cm, the volume percentage of the carbon fibers relative to the resin being less than 70% and the fibers moving freely relative to one another in the mat when the sheet-shaped product is in a mold subjected to a pressure so that, at that pressure and the lay-up percentage employed in the mold, a net end product with a homogeneous fiber distribution is obtained.

Using flow molding for sheet-shaped products containing mats consisting of carbon fibers with lengths of more than 1 cm in a matrix of radical-curable resin is not obvious. Although SMC technology in general has long been known, and mats consisting of carbon fibers have long been known per se, SMCs based on carbon mats have hitherto never been marketed.

In the case of SMCs based on aminoplasts, by contrast, using mats is assumed to be advantageous because the compounds have to be dried before the processing, which can for example be done by placing the impregnated mats on a chain conveyor.

Mats consisting of radical-curable resin containing (carbon) fibrous material are incidentally used in so-called hand-lay-up (HLU) or resin-transfer-molding (RTM) techniques. Those techniques however involve the disadvantage that the required cycle times are relatively long and that only series of a limited size can be produced with them. An additional advantage of the present invention is that the SMCs according to the invention can be processed with cycle times like those that are customary in processing chopped-strand glass SMCs.

Wherever this application refers to "mats", they are understood to comprise both isotropic and anisotropic mats.

An 'isotropic mat' is understood to be a mat in which the orientations of the fibers show no regularity, but there is a random distribution of orientations. The carbon fibers in the isotropic mats generally have lengths of at least 1 cm.

An 'anisotropic mat' is understood to be a mat in which the orientations of the fibers show a certain amount of ordering. The fibers in an anisotropic mat may for example be grouped in bundles that cross one another, for example perpendicularly. This also includes unidirectional (UD) mats. In the case of unidirectional carbon fiber reinforcement the use of a dispersed carbon fiber roving (or optionally of a number of dispersed carbon fiber rovings placed next to one another) is also regarded as "mats" as intended in the invention. A special case of a UD mat is a mat consisting of parallel fiber bundles, optionally of varying lengths, which moreover may or may not be staggered longitudinally with respect to one another.

In particular, continuous fibers are used in anisotropic mats. 'Continuous fibers' are understood to be fibers which substantially have a length that is larger than the mat's largest width. The maximum length of the fibers, in particular of the carbon fibers, is then determined by the maximum dimensions within the mat.

If the anisotropic mat consists substantially of continuous fibers, it may be advantageous to include a small amount of shorter fibers, for example fibers shorter than 6 cm, preferably shorter than 4 cm, in particular shorter than 2 cm, in the sheet-shaped product to obtain an even better distribution of fibers on bosses, ridges and rims. It has surprisingly however been found that even when the fibers substantially have lengths that are larger than the mat's greatest width, and in particular even when almost 100% of the fibers have lengths that are larger than the mat's greatest width, excellent 3-D end products with bosses, ribs, rims, etc. can still be obtained.

It is to be noticed that in EP-A-0768340, in a paragraph presenting a general description of possible reinforcement materials which may be added to the very specific unsaturated polyester resin (SMC or BMC) compositions as are being taught in said reference, mentions carbon fibers as the last possibility in a long list of many other fibrous materials, and also presents a list of possible forms of such fibrous materials, including the form of chopped strand mats. There is no teaching whatever in EP-A-0768340 that indeed chopped strand mats are being used conveniently as the reinforcement material, and so there is even less suggestion that carbon fiber chopped strand mats would be used. In fact said reference rather would suggest the use of chopped strand fibers (see page 11, lines 56–59). Moreover, in all examples, comparative examples and figures of EP-A-0768340 where fiber reinforcement material is being used, such material consists glass fiber (rovings), which is being chopped.

It is to be noticed, moreover, that the object of EP-A-0768340 is to provide (reinforced) unsaturated polyester resin compositions, which can be molded at a low temperature (40 to 100° C.) under a low pressure (0.1 to 10 kg/cm$^2$). Said aim is achieved by providing a specific mechanism of thickening (namely an alternative for metal oxide thickening): component (B) of EP-A-0768340 is a thickening agent containing powder of a thermoplastic resin as the effective component (in an amount of 20–120 parts by weight per 100 parts by weight of the unsaturated polyester). Thus, the compositions of EP-A-0768340 are necessarily different from the compositions according to the present invention, which contain metal oxide thickeners or thickeners equivalent therewith (usually in amounts of 10 parts by weight or less per 100 parts by weight of the unsaturated polyester). In other words, EP-A-0768340 teaches away from the present invention by replacing metal oxides (for instance, magnesium oxide) as thickener by another.

Besides the carbon fibers, the mats may also contain other fibrous materials. Examples are mats consisting of carbon fibers and (optionally metal-coated) glass fibers, carbon fibers and aramid fibers, or carbon fibers and steel fibers. These may be both isotropic and anisotropic combinations of fibrous materials. A combination of isotropic and anisotropic reinforcement is also possible, for example chopped random glass fibers with continuous UD carbon fibers. Combinations of isotropic and anisotropic reinforcement can also be realised with one type of fibrous material, for example UD carbon and random carbon in one mat.

The moulds may also be filled by stacking different types of compounds in the mold, for example by using a first SMC that contains for example UD reinforcement and a second SMC that contains for example random reinforcement.

The fibers in the mats can be bound together in different ways for the purpose of giving the mat sufficient mechanical consistency. This can for example be effected by connecting the fibers by sewing them together with a thread. This thread may be for example a polyester thread or a glass thread. It is also possible to use a polymer with a low melting point as the thread, such as PE or PP. Preferably use is made of a thread that softens at the processing temperature. To avoid any doubt it should be noted that the different ways in which the fibers in the mats can be bound together do not include binding together by means of weaving.

The fibers can also be stuck together by applying a binder. Preferably use is made of binders that soften at the processing temperature or that dissolve in the resin mixture at that temperature. The employed amount of binder will usually be between 1 and 5 wt. % relative to the amount of fiber.

The volume percentage of the fibrous material (that is the total of the carbon fibers and any other fibrous material) relative to the resin must be less than 70%. This maximum is however reached only in the case of a unidirectional fiber reinforcement. In the case of biaxial or multiaxial reinforcement a maximum volume percentage of the fibrous material of 45% will usually be feasible. In the case of random fiber reinforcement the maximum volume percentage of the fibrous material will generally be about 30%. When one and the same mat contains a combination of the aforementioned types of reinforcements, the maximum volume percentages may differ from those mentioned above. A person skilled in the art will be able to easily determine what volume percentage of the fibrous material, depending on the type of fibrous material chosen and the type of carbon mats (i.e. the type of reinforcement) and on the resin chosen, will yield the best results.

Fiber contents that are very suitable for practical use are 40–60 volume percent in the case of UD reinforcement, 25–40 volume percent in the case of multiaxial reinforcement and 20–30 volume percent in the case of random reinforcement. A practical lower limit of the volume percentage of fibrous material will in all cases be approximately 10%. In all cases these percentages are relative to the total of fibrous material, resin and any fillers and other additives present.

The amount of resin mixture used per m$^2$ of fibrous material can incidentally easily be adjusted by removing resin mixture, for example with the aid of rolls. It is also possible to apply more or less of the resin mixture to the mats of the fibrous material by adjusting its viscosity. As described above, the surface weight of the fibrous material can also determine the amount of resin mixture absorbed.

In the invention a radical-curable resin, that is, a resin that contains an unsaturation capable of being cured by radicals, is used as the thermosetting resin mixture. Examples of such resins are: unsaturated polyester resins, vinyl ester resins and hybrid resins, such as polyester-polyurethane hybrids prepared via condensation of a polyester polyol with a di- or polyisocyanate followed by radical curing. A suitable example of such a hybrid resin are the DARON™ hybrid resins of DSM Resins. Suitable examples of usaturated polyester resins and vinyl ester resins are the SYNOLITE™ and ATLAC™ resins, respectively, of DSM Resins.

The viscosity of the thermosetting resin mixture may vary within a reasonable range, depending on the type of resin chosen, the type of mats, etc. A person skilled in the art will—in a relatively simple way—be able to find an optimum combination of the viscosity concerned, the type of mats, the volume percentage of the fibrous material, etc.

Providing sheet-shaped products comprising a radical-curable resin according to the invention and using a fibrous material in the form of carbon mats according to the invention results in a sheet-shaped product that is extremely suitable for being processed by means of flow molding.

Flow molding is a technique in which sheet-shaped products are stacked and laid in a mold so that the mold surface is not entirely covered with the compound. The covered part is called the lay-up percentage. The mold is then closed and the compound is pressurised so that the mold is completely filled and a molded part (net end product) with a homogeneous distribution of fibers throughout the entire molded part is obtained. To this end it is necessary that, even when mats are used, the fibers in the mat can move freely relative to one another during the compression step.

Preferably the fibrous material in the sheet-shaped product consists entirely of carbon fibers. High mechanical properties are then obtained at a relatively low weight. Properties can then moreover be obtained which cannot be realised with other fibrous materials such as glass.

Preferably the carbon fibers are present in the sheet-shaped product in the form of an isotropic or anisotropic mat.

The surface weight of the fibrous material (carbon fibers and any other fibrous material present) may be chosen within a wide range. Suitable surface weights lie for example between 10 and 2,000 g/m$^2$.

Preferably a surface weight of between 150 and 700 g/m$^2$ is used. This results in an optimum combination of impregnation behaviour during the production of the sheet-shaped product and its flow properties during flow molding.

The radical-curable resin in the sheet-shaped product according to the invention is most preferably an unsaturated polyester resin, a vinyl ester resin or a hybrid resin. The advantages of the product according to the invention will then be particularly evident. Particularly suitable unsaturated polyester resins, vinyl ester resins and hybrid resins have already been mentioned above. Such resins are commercially obtainable.

Preferably the radical-curable resin in the sheet-shaped product has an elevated viscosity as a result of thickening. This can for example be achieved through a reaction with a metal oxide or a diisocyanate (known as maturation of the compound). The viscosity required to produce molded parts from the sheet-shaped products is determined primarily by the type of molded part that is to be produced and by the type of mat used. This can easily be determined by a person skilled in the art.

The sheet-shaped product according to the invention may also contain all kinds of fillers. These fillers are the same as the usual fillers for sheet-shaped products based on for example unsaturated polyester resin. Chalk, calcium carbonate, clay, carbon particles, silica and/or metal particles are for example used as fillers. The sheet-shaped product may also contain catalysts, mold release agents, pigments and other common additives.

The invention also relates to a process for the production of a sheet-shaped product in which fibrous material (i.e. mats of carbon fibers and any other fibrous material present) is as described above impregnated with a radical-curable resin, after which thickening of the resin to a desired viscosity takes place.

The sheet-shaped products thus obtained and thickened to the right extent can be very easily processed into products by means of flow molding. The pressure employed in the flow molding is generally between 20 and 200 $10^5$ N/m$^2$, preferably between 40 and 110 $10^5$ N/m$^2$. The usual molding temperature, which also effects the curing of the radical-curable resin, is between 80 and 250° C., preferably between 110 and 190° C.

The products obtained in flow molding (e.g. molded parts) show very good mechanical properties as a result of the excellent flow of the product according to the invention during the flow molding. Typical mechanical properties at a total carbon fiber content of 20–60 vol. %, e.g. with an unsaturated polyester resin as the matrix, are given in the following table for
(1) UD reinforcement (without filler)
(2) biaxial reinforcement (with and without filler)
(3) random reinforcement (with and without filler).
Measured values are specified for
 tensile strength; measured according to ISO 178, in MPa,
 tensile modulus; also according to ISO 178, in GPa.
Calcium carbonate was used as the filler.

TABLE

|  | fibre/filler content [Vol. %] | tensile strength [MPa] | tensile modulus [GPa] |
| --- | --- | --- | --- |
| UD without filler | 40–60/0 | 1100–1550 | 90–130 |
| Biax. with filler | 20–45/40 | 300–700 | 25–60 |
| Biax. without filler | 20–45/0 | 240–650 | 20–55 |
| Random with filler | 20–30/40 | 280–400 | 25–35 |
| Random without filler | 20–30/0 | 240–350 | 20–30 |

The sheet-shaped products are hence very suitable for use in the production of large molded parts with for example ribs and bosses such as seat shells, housings, fittings, body parts for lorries and cars. The particularly good mechanical properties at—especially when carbon fibers are used—a low weight of the molded parts obtained, their thermal stability, the molded part's high heat deflection temperature and the excellent fatigue properties are then major advantages.

The invention also relates to a process for the production of molded parts with a tensile modulus of >20 GPa, in particular >40 Gpa, and preferably >70 GPa, a tensile strength of >200 MPa, in particular >500 Mpa, and preferably >900 MPa, by flow molding sheet-shaped products as described above.

The invention will now be elucidated with reference to the following example without being limited thereto.

EXAMPLE 1

A biaxial carbon fiber mat (40 cm wide, consisting entirely of continuous fibers) with a surface weight of 450 g/m$^2$ was on a small-scale SMC line impregnated with a hybrid resin, Daron™ XP-45 from DSM Resins, the Netherlands. The resin was then for 3 days thickened with a diisocyanate. A sheet-shaped product with a fiber content of about 31 vol. % was obtained. This sheet-shaped product was processed further with the aid of flow molding in a mold (70% lay-up percentage) to obtain a three-dimensional object with bosses and ribs. Molding was effected with the aid of a 360-tonne press (Diefenbacher) at a pressure of 100 bar. The sheet-shaped product showed excellent flow behaviour and the mold filled up entirely. A net end product with the desired bosses and ribs was obtained. The fiber distribution in the net end product obtained was homogeneous. Bar-shaped specimen were cut from flat parts of the end product obtained in order to determine the mechanical properties. The tensile modulus and tensile strength of these specimen, measured according to ISO 178, were 42.7 GPa and 535 MPa, respectively.

What is claimed is:

1. A sheet-shaped product processable by flow moulding, comprising carbon fibres and a thermosetting resin mixture comprising a radical-curable resin as the matrix, wherein the carbon fibres are present in the form of mats that consist substantially of fibres with lengths of more than 1 cm, the volume percentage of the carbon fibres relative to the resin being less than 70% and the carbon fibres in the mats moving freely relative to one another when the sheet-shaped product is subjected to a pressure in a mould.

2. The sheet-shaped product according to claim 1, wherein the fibrous material consists entirely of carbon fibres.

3. The sheet-shaped product according to claim 2, wherein carbon fibres are present in the sheet-shaped product in the form of an isotropic or anisotropic mat.

4. The sheet-shaped product according to claim 1, wherein the surface weight of the fibrous material is between 150 and 700 g/m$^2$.

5. The sheet-shaped product according to claim 1, wherein the radical curable resin is an unsaturated polyester resin, vinyl ester resin or hybrid resin.

6. The sheet-shaped product according to claim 1, wherein the radical-curable resin has an elevated viscosity as a result of thickening.

7. A process for the production of a sheet-shaped product according to claim 1, comprising impregnating the mats with a radical-curable resin, followed by thickening of the resin to a predetermined viscosity.

8. A process for the production of moulded parts with a tensile modulus of >20 GPa, a tensile strength of >200 MPa comprising flow moulding of sheet-shaped products obtained by the process according to claim 7 at a pressure between 20 and 200×10$^5$ N/m$^2$.

9. A process according to claim 8, wherein said tensile modulus is >40 GPa.

10. A process according to claim 8, wherein said tensile modulus is >70 GPa.

11. A process according to claim 8, wherein said tensile strength is >500 MPa.

12. A process according to claim 8, wherein said tensile strength is >900 MPa.

* * * * *